United States Patent [19]
Rhodes

[11] Patent Number: 5,487,322
[45] Date of Patent: Jan. 30, 1996

[54] STORE EJECTOR

[75] Inventor: Glenn M. Rhodes, Bedfordshire, England

[73] Assignee: M L Aviation Limited, Berkshire, England

[21] Appl. No.: 563,915

[22] Filed: Jun. 15, 1990

[30] Foreign Application Priority Data

Jul. 6, 1989 [GB] United Kingdom ............... 8915503

[51] Int. Cl.⁶ .................................................. B64D 1/02
[52] U.S. Cl. ............................ 89/1.56; 89/1.57; 244/137.4
[58] Field of Search ............................. 89/1.57, 1.51, 89/1.56; 244/137.4

[56] References Cited

U.S. PATENT DOCUMENTS

| 4,043,525 | 8/1977 | Jakubowski | 89/1.57 |
| 4,377,103 | 3/1983 | Kovalenko | 244/137.4 |
| 4,388,853 | 6/1983 | Griffin et al. | 89/1.57 |
| 4,669,356 | 6/1987 | Griffin et al. | 89/1.57 |
| 4,750,403 | 6/1988 | Huber et al. | 89/1.51 |

*Primary Examiner*—Charles T. Jordan
*Assistant Examiner*—Theresa M. Wesson
*Attorney, Agent, or Firm*—Nixon & Vanderhye

[57] ABSTRACT

A store ejector includes at least one fluid pressure operated ram (4). In use the ram (4) engages and ejects a store (5). The ejector includes a source of fluid under pressure and a throttle valve connected between the source of fluid under pressure and the ram (4). A pressure sensor detects the pressure supplied to the ram and an extension sensor monitors the extension of the ram. A computer receives inputs from the pressure and extension sensors and provides a control output to the throttle valve to control the valve to provide a predetermined applied thrust profile to the store.

15 Claims, 4 Drawing Sheets

STORE EJECTOR

BACKGROUND OF THE INVENTION

1. Field of the Invention

To release a store such as a bomb, missile or other munition from an aircraft it is commonplace to mount the store on a suspension arrangement including two suspension hooks and, upon release of the suspension hooks positively to eject the store away from the aircraft. This is necessary to ensure that the store falls away from the aircraft and is not held entrained by the airstream against the aircraft.

2. Discussion of Prior Art

There have been many attempts to improve the existing store ejector system and one of the most sophisticated is described in our earlier British patent application no. 8905697.2 which describes a store ejector in which the ejection thrust applied to the store varies as the store moves away from the aircraft. It achieves this by including a variable orifice valve between a source of pressurized fluid such as an ignited pyrotechnic cartridge and a pneumatically operated ram driven by the high pressure fluid. The operating member of the variable orifice valve is connected directly to the ram so that as the ram extends it automatically moves the operating member of the variable orifice valve to vary the degree of throttling of the high pressure fluid. This arrangement is a considerable advance over previous systems where the ejection thrust was solely dependent upon the rate of burning of the pyrotechnic cartridges and any fixed throttles located between them and the rams but, it only operates over the initial movement of the ram and requires the manual fitting of the appropriate variable orifice valve to match the store to be loaded onto the suspension system.

In any store ejector which requires as its source of fluid under pressure the initiation of pyrotechnic cartridges the particular pressures that are obtained vary with the number and power of the cartridges loaded into the breaches and also vary with the individual burning characteristics of each cartridge. Whilst attempts are made to provide cartridges with a reliable and repeatable burning characteristic they do still vary from one to another and from batch to batch with the result that variations in the pressure generated by the individual cartridges gives rise to variations in the ejection of the store.

SUMMARY OF THE INVENTION

According to this invention a store ejector comprises at least one fluid pressure operated ram which, in use, engages a store and ejects it, a source of fluid under pressure, a throttle valve connected in series between the source of fluid under pressure and the ram, a programmed computer, a pressure sensor operatively connected to the computer to monitor the fluid pressure applied to the ram and input a pressure signal representative of the pressure to the computer, and an extension sensor operatively connected to the computer to monitor the extension of the ram, the computer also being operatively connected to the throttle valve and being programmed to control the throttle valve in response to the output of the pressure and extension sensors.

With store ejector in accordance with this invention the programmed computer controls the operation of the throttle valve so that the pressure applied to the ram and hence the thrust exerted on the store by the ram is controlled throughout the ejection of the store in response to the degree of extension of the ram. This arrangement automatically takes account of variations in the pressure of the source of fluid under pressure and ensures that the store is always subjected to the same predetermined applied thrust profile during its ejection.

Preferably the store ejector has two rams arranged in a fore and aft configuration with respect to the store and each ram includes its own extension sensor operatively connected to the computer to monitor its extension. Only a single pressure sensor and throttle valve may be provided to feed both rams and this is particularly preferred when the rams operate in unison but, alternatively, a separate throttle valve and separate pressure sensor may be provided for each ram. Such an arrangement enables the store to be launched at a particular attitude with respect to the aircraft, namely in a nose-down or nose-up attitude and, in this case, the computer is preferably programmed to compare the output of the two extension sensors and control the individual throttle valves so that the store adopts the correct predetermined attitude.

Preferably the computer includes a memory which is programmed to take account of the constructional details of the store ejection system and apply any necessary correction factors resulting from the construction of the store ejection system to the relationship between the pressure and extension of the rams. Preferably also the memory of the programmed computer stores the required ejection thrust to extension profiles that are required for all of the different stores that are capable of being handled by the suspension system. Upon fitting a store to the ejector unit a code is entered manually indicating the type of store to be fitted or, alternatively, the store includes a code and the store ejector includes a code reader to read the code from the store which identifies the nature of the store and loads the appropriate ejector thrust/extension profile corresponding to that determined for that store into the programmed computer. The predetermined ejection thrust/ram extension profile typically takes account of the weight of the store, the casing strength of the store, and the required ejection velocity.

Preferably the computer also receives flight related information such as air speed, altitude, attitude, acceleration, temperature, humidity, and air to ground speed and is programmed to vary the pressure/extension profile in accordance with this flight related information. In this way the store ejector in accordance with this invention ensures that the store is always ejected at the precise time in the attack window so that the store is always ejected in the optimum fashion taking account of whether a high or low level attack is being made, taking account of the nature of the store and taking account of the prevailing weather and actual flight condition of the aircraft. Preferably the flight related information is derived from the existing aircraft avionics but, if required, the store ejector may include its own sensors to sense the flight related variables such as airspeed, altitude, attitude, acceleration, temperature and humidity.

The source of fluid may be a high pressure reservoir filled with a pressurised gas or air or containing a hydraulic liquid. In the past attempts have been made to use high pressure reservoirs filled with pressurised gas or air or hydraulic liquid but these have usually been unsuccessful as a result of changes in their performance resulting from the wide variety of different operating temperatures and other external environmental conditions. However, with the arrangement in accordance with this invention, since the throttle valve takes account of these uncontrollable external environmental conditions such sources can be used with the present invention. Nevertheless it is preferred that the source of fluid under pressure is derived from one or more pyrotechnic cartridges which are initiated immediately before ejection is required. Again since the throttle valve takes account of the pressure applied to the ram variations in the performance of the pyrotechnic cartridges are taken account of by the programmed computer varying the opening of the throttle.

Preferably the throttle valve also includes a dump valve. In this case, the throttle valve adjusts the area of the flow path from the source of fluid under pressure to the ram and the dump valve is essentially a diverter port in the gas system which vents a proportion of the gas to atmosphere thus reducing the overall pressure in the system. The throttle valve may be of the variable orifice type with an operating member driven by, for example, an electrical stepper motor, a system comprising a number of flow paths in parallel each of which includes its own ON-OFF valve so that one or more of the valves is opened to provide an increase in the area of the flow path, or may be formed by an arrangement of holes passing through fixed throttle and dump valve control plates. The gas flow rate and hence the piston and dump valve pressure in the latter case is dependent upon the number of holes present which admit gas to flow through them. In this latter case preferably the holes and closure plates are shaped to provide an essentially stepless operation.

The extension sensors may have the form of a simple geared or directly coupled single or multi-turn potentiometer to provide a variable voltage level representative of the extension of the ram, a coded disc, or frequency modulated encoder. The information from these sensors may be coupled by optical signals and optical fibres to the programmed computer to enable the device to operate satisfactorily in radiation contaminated zones.

The store ejector in accordance with this invention is very much more versatile than that used previously with the result that stores can be dropped more accurately and over a wide range of different conditions. When the sensor unit is arranged to be responsive to flight related variables it can take account of the rapidly changing in-flight conditions and ejector also takes account of the way in which the ejector responds during its operation

BRIEF DESCRIPTION OF THE DRAWINGS

A particular example of a sensor system in accordance with this invention is shown in the accompanying drawings in which.

DETAILED DESCRIPTION OF THE PREFERRED EMBODIMENTS

Figure 1:
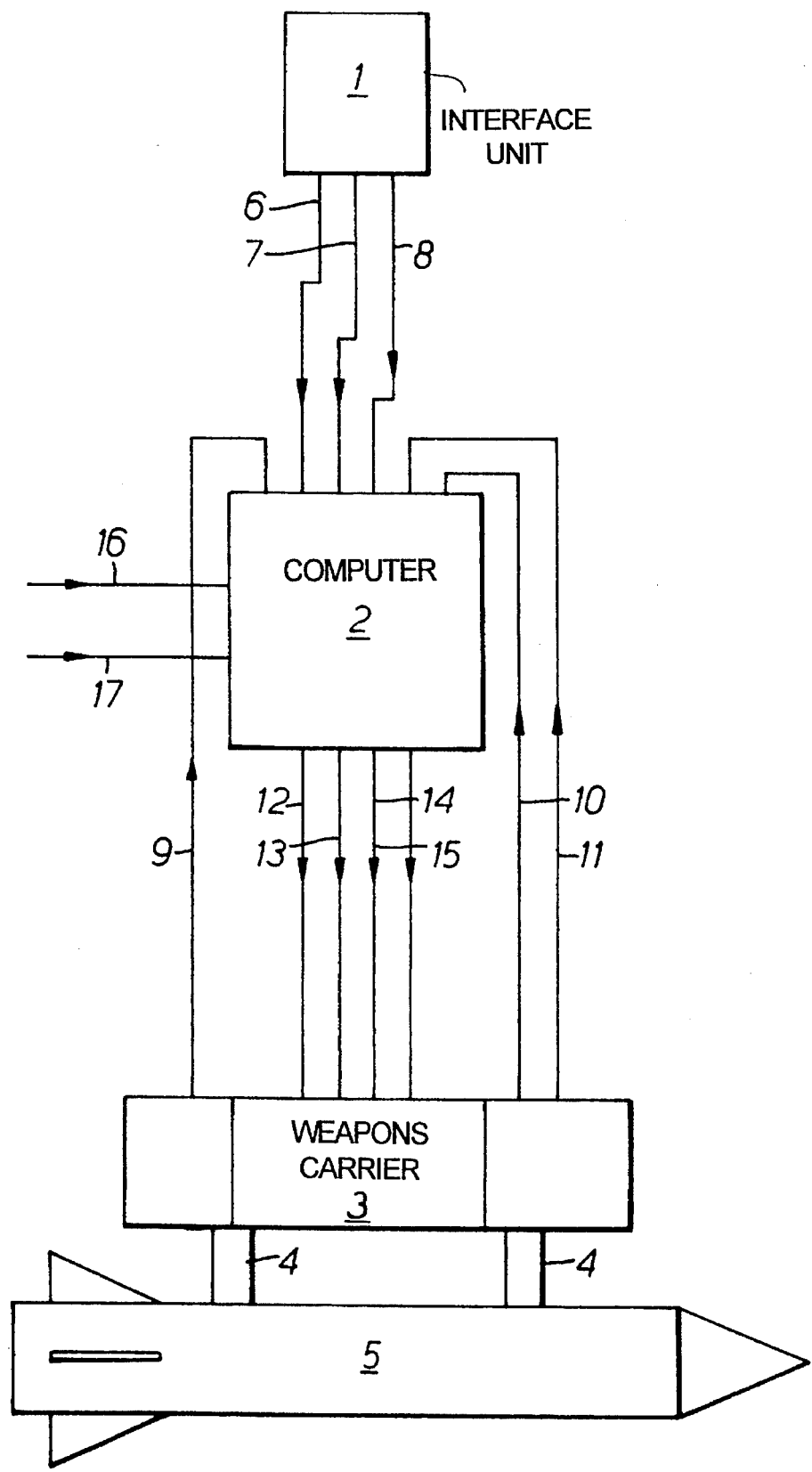
FIG. 1 is a block diagram of a ejector system.

In the block diagram reference numeral 1 indicates an in-flight information sensor or interface unit, 2 a programmed computer, 3 a weapons carrier including two pneumatic rams 4. 5 indicates a weapon or store held by the carrier which is ejected by the rams 4. The various inputs and outputs to the programmed computer 2 are as follows: 6 aircraft speed input, 7 aircraft attitude input, 8 aircraft acceleration input, 9 input from ram extension sensors, 10 input from store on/store gone sensor, and 11 information on the store type. Outputs from the programmed computer 2 are: 12 a jettison command, 13 a release command to release the suspension hooks (not shown), 14 a fusing instruction to arm the weapon, and 15 the control signal to vary the throttle valve (again not shown in the figure). Further inputs to the programmed computer 2 are 16 a fire command instruction and 17 a jettison command instruction. The fluid supply can be pressurized by a high pressure fluid reservoir and/or a pyrotechnic cartridge shown in dotted line as pressurization alternatives.

Figure 2:
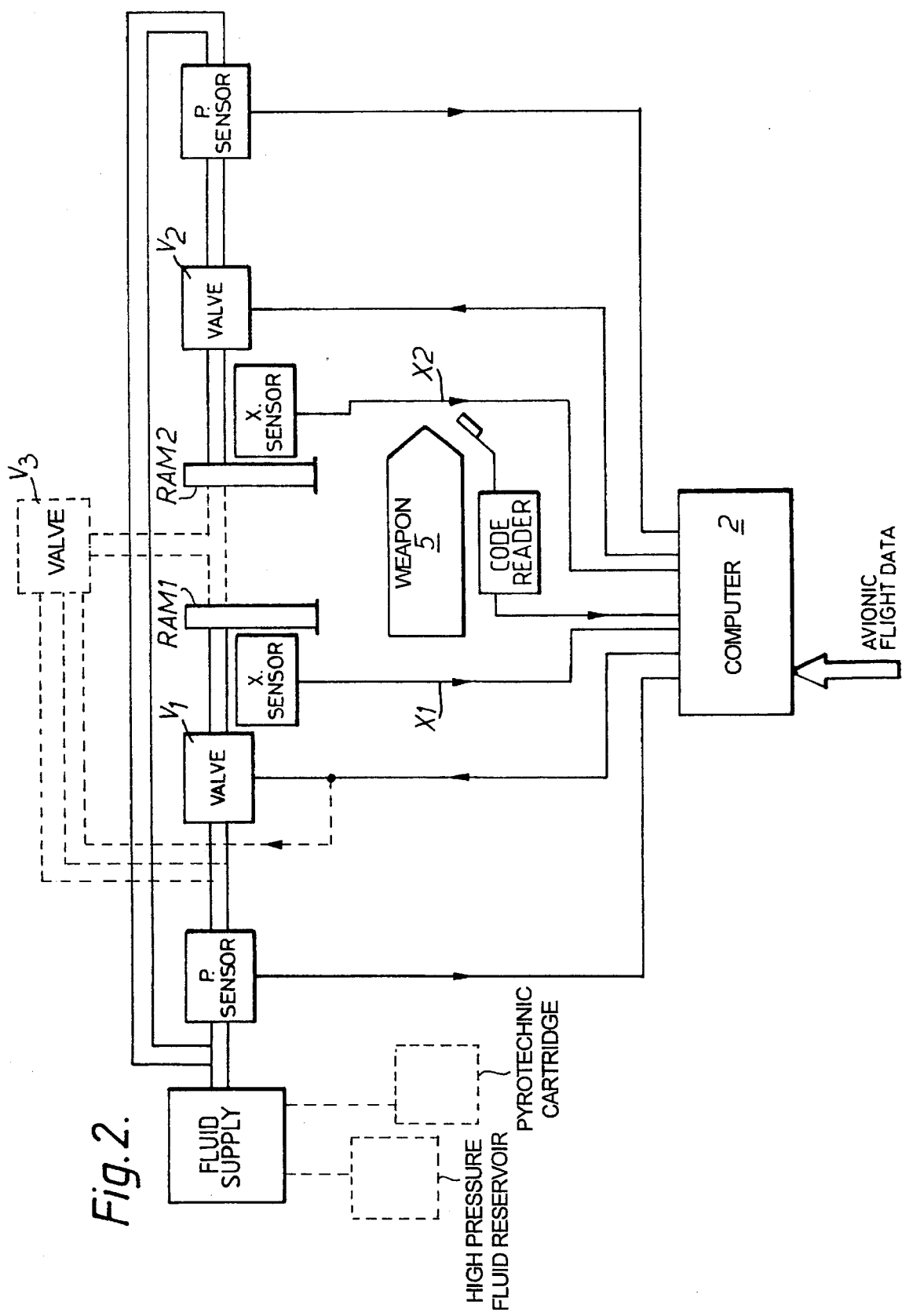
FIG. 2 is a detailed block diagram of an ejector system using dual ejector rams.
Figure 3:
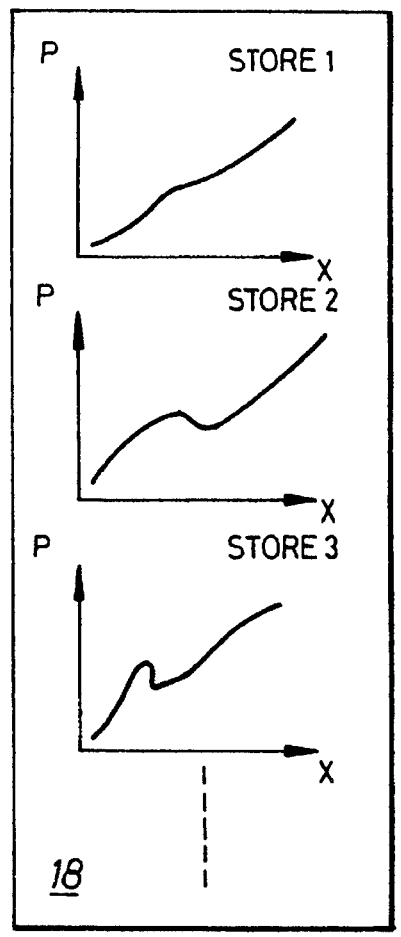
FIG. 3 is a diagram showing different thrust profiles stored in a region of processor memory.

FIG. 2 is a block diagram showing in further detail one embodiment of the present invention. This embodiment uses two fluid pressure actuated rams arranged fore and aft with respect to the store 5. Respective throttle valves V1,V2 and pressure sensors P1,P2 are provided in the supply of fluid to each ram, RAM1,RAM2. Each ram has a respective extension sensor which outputs extension data X1,X2. The control processor also receives flight data relating to airspeed, altitude, attitude, acceleration, temperature, humidity and air to ground speed. This data is received by an interface from existing aircraft avionics. The processor also receives data from a code reader CR which reads identification data from the store 5. On the basis of this identification data the processor selects one of a number of thrust profiles STORE1,STORE2,STORE3 . . . stored in a region 18 of random access memory within the processor. Then, on the basis of the data received from the sensors the processor establishes the current position of the ejector on the appropriate pressure/extension plot and outputs control data to the valves V1,V2 to modify the pressure supplied to the rams RAM1,RAM2 as appropriate to maintain the ejector on or near the appropriate plot as the rams RAM1,RAM2 are extended to eject the store 5. Alternatively, a single valve V3 could be used to control both rams as shown in dotted line.

The precise nature of the output from the processor is tailored according to the nature of the valve used. For example, each valve may comprise a variable orifice valve as shown in FIG. 4C in which case the processor, via a standard industrial interface of the type well known to the skilled artisan, generates an electrical output signal to drive the activating member which increases or decreases the area of the open orifice within the valve. In an alternative arrangement shown in FIG. 4B, the valve comprises a throttle plate positioned between the supply and the ram and a vent plate positioned on a branch for venting the supply to the atmosphere. Each plate has a number of holes formed through it in a predetermined configuration and has a co-operating closure plate which is driven by an electric motor (not shown) in response to respective control signals from the processor. As the closure plate is moved with respect to the vent or throttle plate the number of holes open in the plate for the flow of gas changes and so by venting the supply to the atmosphere and or by throttling the flow to the ram the vent and throttle plates in combination enable accurate control of the pressure supplied to the respective ram.

Figure 4A:
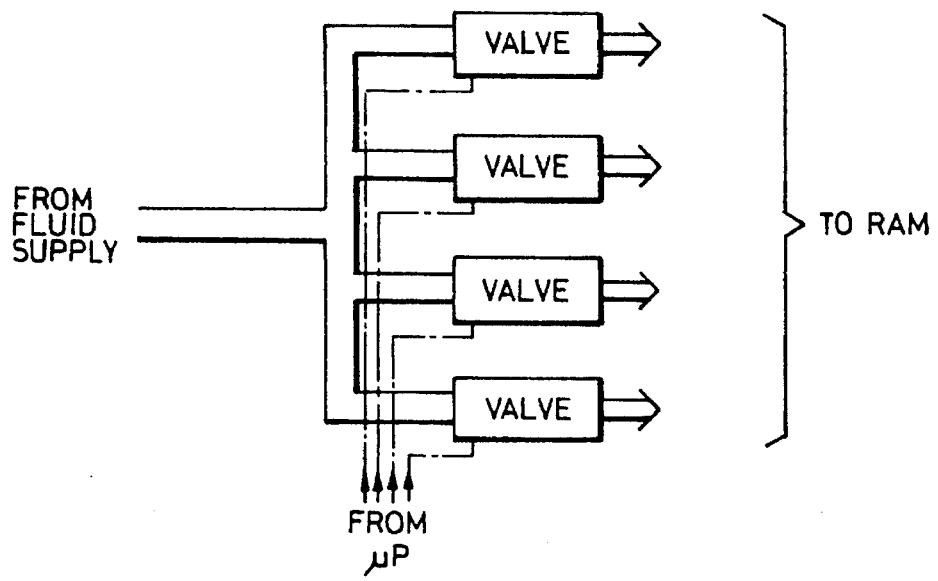
FIGS. 4A to 4C are diagrams showing schematically alternative arrangements for a throttle valve
Figure 4B:
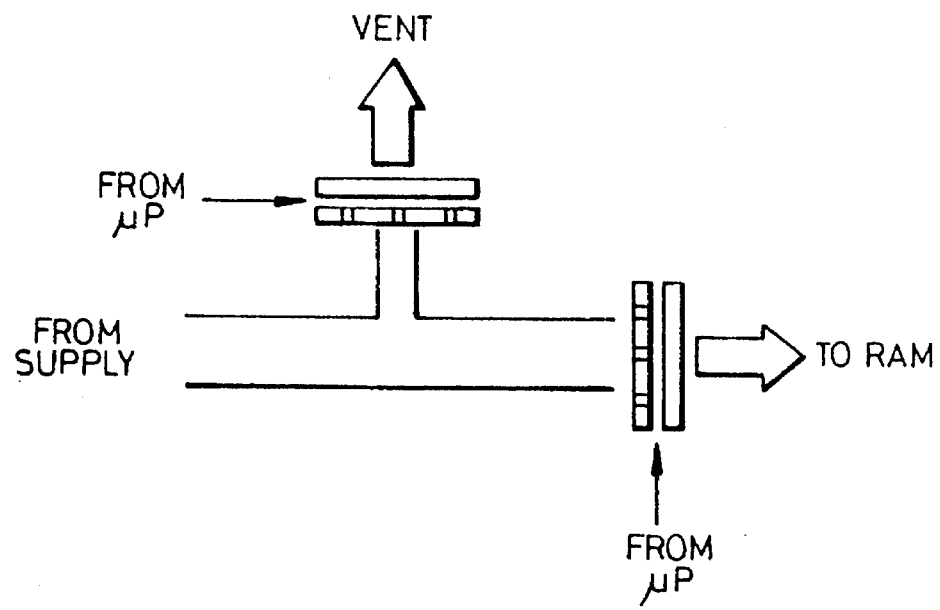
Figure 4C:
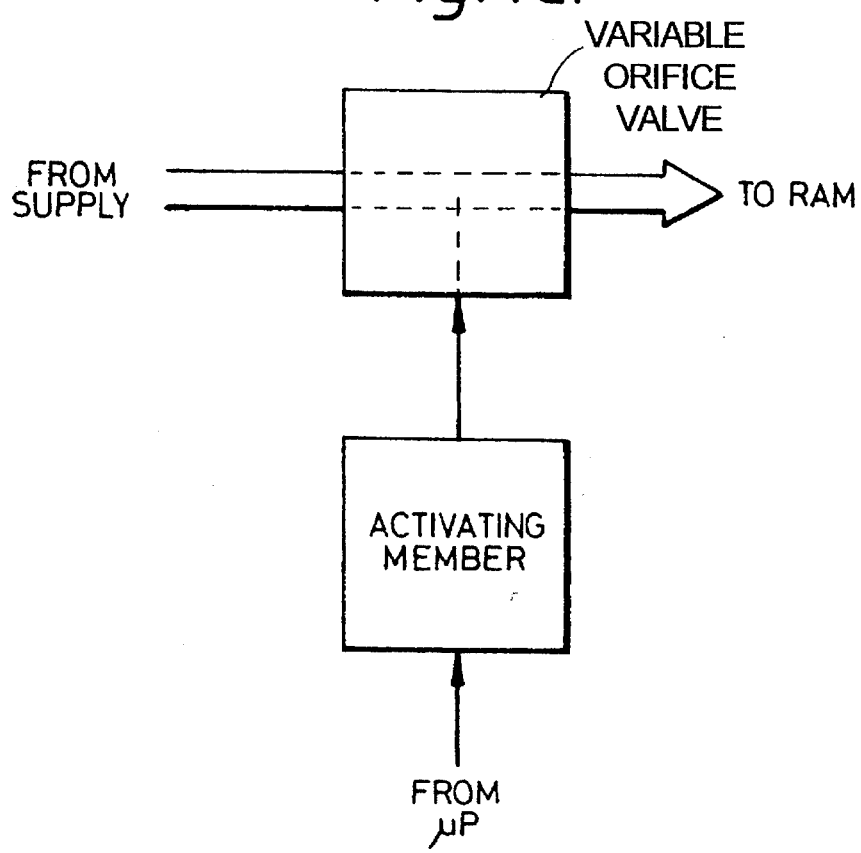

In a further alternative arrangement shown in FIG. 4A the fluid supply to the ram is divided into a number of parallel paths. In the illustrated example just four valves are shown but in practice many more may be used. Each path has a respective electro-pneumatic ON-OFF valve connected to receive control signals output by the processor. The processor then increases the pressure supplied to the ram by increasing the number of valves which are ON and conversely can throttle the supply and decrease the pressure by switching more valves OFF.

As already noted, a plurality of different thrust profiles are stored in the memory of the processor. Feedback from the pressure and extension sensors and comparison by the processor of the pressure and extension data with the appropriate thrust profile enables generation of an appropriate control signal for the valves. In practice however the stored profiles are appropriate for launching the store under certain standard nominal conditions. When, for example, the store is to be launched at an airspeed outside the nominal range associated with the standard thrust profile, then it is desirable to correct that profile. The processor is therefore programmed to take the initial uncorrected control output and to apply a correction factor in accordance with received avionic data relating to airspeed, altitude, attitude, acceleration, temperature, humidity and air to ground speed. In the preferred embodiment described different respective thrust profiles and corresponding respective control signals are used for each ram. The processor, for example, evaluates $T_{1,store}(x,P_1)$, where $T_{1,store}$ is the thrust profile as a function of extension x and pressure P for RAM1 when used to eject a first category of store, STORE1. The evaluated thrust profile is then compared with the input from the respective pressure sensor and from the extension sensor associated with the ram RAM1. A control signal v for valve V1 is determined in accordance with the difference between the evaluated function and the measured values. The control value v is then modified in accordance with the function $$F(A,v) \rightarrow v^1$$

where A is a function of the avionic data and F is in turn a function of the avionic data and the unmodified control signal v. The modified control signal $v^1$ is then applied to the respective valve V1 via an appropriate control interface.

Control signals are generated for the other ram RAM2 in a precisely analogous manner.

I claim:

1. A store ejector comprising:
   a fluid pressure operated ram for engaging and ejecting a store,
   means for supplying fluid under pressure to said ram,
   a throttle valve connected in series between said means for supplying and said ram,
   programmable means for computing operatively connected to said throttle valve,
   means operatively connected to said programmable means for monitoring a fluid pressure applied to said ram and inputting to said programmable means a signal representative of said fluid pressure, and
   means operatively connected to said programmable means for monitoring extension of said ram and inputting to said programmable means a signal dependent on said extension,
   said programmable means including means for outputting a control signal to said throttle valve for controlling said throttle valve in response to outputs of said means for monitoring a fluid pressure and said means for monitoring extension of said ram, thereby controlling said ram to apply a predetermined thrust profile to said store.

2. The store ejector of claim 1, comprising two fluid pressure operated rams arranged fore and aft with respect to said store and respective means for monitoring extension operatively connected to each said ram and operatively connected to said programmable means for computing.

3. The store ejector of claim 2, wherein a single throttle valve is connected in common between said means for supplying and both said fluid pressure operated rams.

4. The store ejector of claim 2, comprising first and second throttle valves and first and second means for monitoring a fluid pressure, a respective throttle valve and means for monitoring fluid pressure being connected between each said fluid pressure operated ram and said means for supplying fluid.

5. The store ejector of claim 4, wherein said programmable means for computing include means for comparing outputs of said respective means for monitoring extension and controlling said respective first and second throttle valves, the fluid pressure operated rams thereby launching said store in a predetermined attitude.

6. The store ejector of claim 1, wherein said programmable means for computing include means for applying a correction factor determined in accordance with the construction of said store ejector.

7. The store ejector of claim 1, wherein said programmable means for computing include means for storing a plurality of different thrust profiles corresponding to different respective stores, and means for selecting one of said plurality of thrust profiles appropriate to a particular store to be fitted to said ejector.

8. The store ejector of claim 7, wherein said means for selecting include means for reading from said store a code identifying said store and selecting a corresponding profile accordingly.

9. The ejector of claim 1, wherein said programmable means for computing include means responsive to flight related data for varying said control signals applied to said throttle valve in accordance with said flight related data.

10. The store ejector of claim 1, wherein said means for supplying fluid under pressure include a high pressure fluid reservoir.

11. The store ejector of claim 1, wherein said means for supplying fluid under pressure include a pyrotechnic cartridge.

12. The store ejector of claim 1, wherein said throttle valve includes a dump valve arranged to vent said means for supplying pressure thereby reducing pressure supplied to said ram.

13. The store ejector of claim 1, wherein said throttle value includes a variable orifice and an operating member connected to said orifice for opening or closing said orifice.

14. The store ejector of claim 1, wherein said throttle valve includes a plurality of parallel flow paths, and respective ON-OFF valves for each said parallel flow path.

15. The store ejector of claim 12, wherein said throttle valve includes a throttle control plate and a dump control plate, a plurality of holes for the passage of fluid under pressure formed through said throttle and dump control plates, and respective closure plates configurable to vary the number of holes open in said throttle control plate and said dump valve control plate.

* * * * *